US007174387B1

(12) United States Patent
Shand et al.

(10) Patent No.: US 7,174,387 B1
(45) Date of Patent: Feb. 6, 2007

(54) METHODS AND APPARATUS FOR REQUESTING LINK STATE INFORMATION

(75) Inventors: Ian Michael Charles Shand, Cobham (GB); Mark T. Schaefer, Belmont, CA (US)

(73) Assignee: Cisco Technology Inc., San Jose, CA (US)

( * ) Notice: Subject to any disclaimer, the term of this patent is extended or adjusted under 35 U.S.C. 154(b) by 1014 days.

(21) Appl. No.: 09/844,420

(22) Filed: Apr. 26, 2001

(51) Int. Cl.
*G06F 15/16* (2006.01)
*G06F 15/173* (2006.01)
*G06F 11/00* (2006.01)

(52) U.S. Cl. .......................... 709/238; 709/237; 714/4
(58) Field of Classification Search ................ 709/238, 709/242; 714/4; 370/216, 254
See application file for complete search history.

(56) References Cited

U.S. PATENT DOCUMENTS

| 5,473,599 | A  | * | 12/1995 | Li et al. ..................... 370/219 |
| 5,742,820 | A  | * | 4/1998  | Perlman et al. ............. 707/201 |
| 6,529,481 | B2 | * | 3/2003  | Akyol et al. ................ 370/250 |
| 6,590,868 | B2 | * | 7/2003  | Shen .......................... 370/242 |
| 6,704,795 | B1 | * | 3/2004  | Fernando et al. ........... 709/237 |
| 6,721,899 | B1 | * | 4/2004  | Narvaez-Guarnieri et al. . 714/4 |
| 6,820,134 | B1 | * | 11/2004 | Zinin et al. ................. 709/238 |
| 6,928,483 | B1 | * | 8/2005  | Cain .......................... 709/238 |
| 2002/0021689 | A1 | * | 2/2002 | Robbins et al. ............. 370/352 |
| 2002/0064132 | A1 | * | 5/2002 | Akyol et al. ................ 370/250 |
| 2003/0058804 | A1 | * | 3/2003 | Saleh et al. ................. 370/254 |
| 2003/0084371 | A1 | * | 5/2003 | Mongazon-Cazavet et al. ........................ 714/13 |
| 2003/0198228 | A1 | * | 10/2003 | Shen ......................... 370/395.2 |
| 2004/0042395 | A1 | * | 3/2004 | Lu et al. ..................... 370/225 |
| 2005/0265260 | A1 | * | 12/2005 | Zinin et al. ................. 370/255 |

OTHER PUBLICATIONS

Callon, "RFC 1195—Use of OSI IS-IS for routing in TCP/IP and dual environments", Dec. 1990, IETF, full document.*
R. Callon, "Use of OSI IS-IS for Routing in TCP/IP and Dual Environments" RFC 1195, Dec. 1990, 79 pages.

* cited by examiner

Primary Examiner—Andrew Caldwell
Assistant Examiner—Douglas Blair
(74) Attorney, Agent, or Firm—Beyer Weaver & Thomas, LLP

(57) ABSTRACT

Methods and apparatus are provided for optimizing the reintroduction of a network node into a network. Information about neighboring nodes is stored in persistent memory. The network node can then be reinitialized and reintroduced into the network. Upon reintroduction, the network node can transmit heartbeat messages such as Hello messages to its neighboring nodes using information stored in persistent memory. A link state packet request message such as a Complete Sequence Numbers Packet referencing dummy link state information is transmitted to a neighboring node. A partial packet request message such as a Partial Sequence Numbers Packet referencing the dummy link state packet from the neighboring node can acknowledge that the Complete Sequence Numbers Packet has been received.

50 Claims, 8 Drawing Sheets

Figure 2

| Node 101 Routing Table | | |
|---|---|---|
| Node 103 | Link 102 | ← 207 |
| Node 105 | Link 112 | ← 211 |
| Node 107 | Link 112 | |
| Node 109 | Link 112 | |
| Node 111 | Link 112 | |

| PATH | Parent | | | | | |
|---|---|---|---|---|---|---|
| | Node | | | | | |
| | Distance | | | | | |
| TENT | Parent | 101 | 101 | | | |
| | Node | 103 | 109 | | | |
| | Distance | 5 | 4 | | | |

603

| PATH | Parent | 101 | | | | |
|---|---|---|---|---|---|---|
| | Node | 109 | | | | |
| | Distance | 4 | | | | |
| TENT | Parent | 101 | 109 | 109 | | |
| | Node | 103 | 111 | 105 | | |
| | Distance | 5 | 6 | 7 | | |

605

| PATH | Parent | 101 | 101 | | | |
|---|---|---|---|---|---|---|
| | Node | 109 | 103 | | | |
| | Distance | 4 | 5 | | | |
| TENT | Parent | 109 | 109 | | | |
| | Node | 111 | 105 | | | |
| | Distance | 6 | 7 | | | |

607

| PATH | Parent | 101 | 101 | 109 | | |
|---|---|---|---|---|---|---|
| | Node | 109 | 103 | 111 | | |
| | Distance | 4 | 5 | 6 | | |
| TENT | Parent | 109 | 111 | | | |
| | Node | 105 | 107 | | | |
| | Distance | 7 | 9 | | | |

609

| PATH | Parent | 101 | 101 | 109 | 109 | |
|---|---|---|---|---|---|---|
| | Node | 109 | 103 | 111 | 105 | |
| | Distance | 4 | 5 | 6 | 7 | |
| TENT | Parent | 111 | | | | |
| | Node | 107 | | | | |
| | Distance | 9 | | | | |

611

| PATH | Parent | 101 | 101 | 109 | 109 | 111 |
|---|---|---|---|---|---|---|
| | Node | 109 | 103 | 111 | 105 | 107 |
| | Distance | 4 | 5 | 6 | 7 | 9 |
| TENT | Parent | | | | | |
| | Node | | | | | |
| | Distance | | | | | |

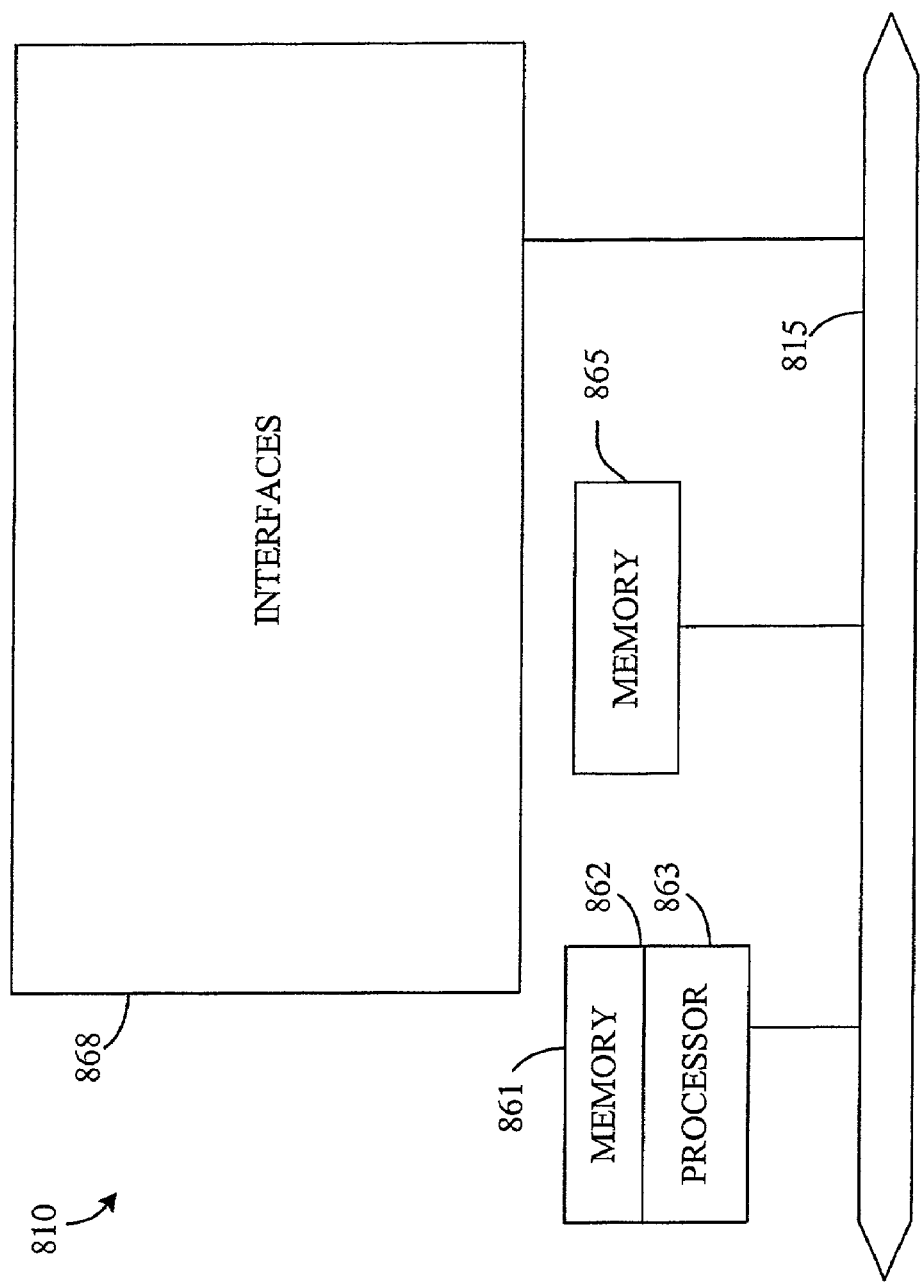

METHODS AND APPARATUS FOR REQUESTING LINK STATE INFORMATION

BACKGROUND OF THE INVENTION

The present invention relates to link state routing. More specifically, the present invention relates to resynchronizing link state information using link state packets from neighboring nodes upon reintroducing a node into a network. Still more specifically, the present invention deals with a network node sending a message to a neighboring network node upon reintroducing the node into the network in order to receive link state packets from the neighboring node.

A network graph is used to generate a routing table in a network node. The routing table allows a network node to determine what link an outbound packet should be transmitted on to move the packet closer to its destination. In order to generate a network graph, a network typically receives link state packets from the other nodes in a network. Each of the link state packets associated with a node contains information about the distance, delay, or cost from the node to one or more neighboring nodes. Distance, delay, or cost all refer to some metric associated with the link between nodes. The packet is then transmitted to all of the network nodes in the network. A network node receiving link state packets from the other nodes in a network can apply Dijkstra's algorithm to generate a network graph for building a routing table.

Network topology, however, can change. New nodes may be added to a network, links or other network nodes can go offline, or a network node can be reinitialized or reintroduced into the network. Information about the change in network topology typically is transmitted by the neighboring node or nodes recognizing the change in topology to all the other nodes in the network. The neighboring node transmits the information by generating a new link state packet and flooding the network with the new information. The nodes in the network use the new link state packet to generate a new network graph that accounts for the change in network topology.

However, processing the change in network topology is resource intensive. Not only is substantial bandwidth used for flooding the network with new link state packets, other packets being transmitted in the network are dropped while the network nodes struggle to generate new routing tables consistent with the new network topology. The generation of new routing tables also requires substantial processor and memory resources at each network node. Although the significant use of network resources is necessary in some instances, reintroduction of a network node into a network does not necessarily require the regeneration of network graphs where the absence of the node is short in duration. For example, a network node or a link may be momentarily offline, or the routing control protocol running on a network node may have been restarted. Typical systems would treat any momentarily downed network node as they would treat any other permanently offline node. New link state information would have to be propagated through the network, resulting in extensive commitment of network resources.

Currently available techniques for reintroducing a node into a network have significant disadvantages particularly with respect to the extensive use of networking and processing resources. It is therefore desirable to provide a system for reintroducing a node in a network that exhibits desirable characteristics as well or better than the technologies discussed above.

SUMMARY OF THE INVENTION

According to the present invention, methods and apparatus are provided for resynchronizing link state information in a network node. Information such as MAC addresses and system IDs of neighboring nodes can be stored in persistent memory and used to transmit heartbeat messages such as Hello messages after network node disruption. Network node disruption occurs, for example, when the routing control protocol running at a network node is restarted.

A link state packet request message such as a Complete Sequence Numbers Packet (CSNP) referencing a dummy link state packet is transmitted to one or more neighboring nodes. A partial packet request message such as a Partial Sequence Numbers Packet (PSNP) referencing the dummy link state packet is received from one or more neighboring nodes. The reference dummy link state packet in the PSNP can be used as an acknowledgement that the CSNP was received by one or more neighboring nodes. The network node then waits for link state packets until none have arrived for a period of time. The link state packets received can then be used to generate a network graph.

One aspect of the invention provides a method for a network node connected to one or more neighboring nodes in a network to acquire link state information from one or more neighboring nodes. The method can be characterized by the following steps: transmitting a first message from the network node to a first neighboring node, the first message referencing dummy link state information; receiving a second message from the first neighboring node, the second message referencing dummy link state information, the second message corresponding to an acknowledgement of receipt of the first message by the neighboring node; and receiving one or more link state packets from the neighboring node, the one or more link state packets corresponding to network link state information.

The first and second messages can be IS-IS messages corresponding a Complete Sequence Numbers Packet and a Partial Sequence Numbers Packet. Other neighboring nodes may also receive messages from the network node referencing dummy link state information. The dummy link state information can correspond with an unused network identifier. The link state information received from neighboring nodes can be used to build a link state database for generating a routing table.

Another aspect of the invention pertains to method for a network node in a network to request link state information from one or more neighboring nodes, the neighboring nodes coupled with the network node. The method can be characterized by the following sequence: maintaining in persistent storage information identifying one or more neighboring nodes; restarting the routing control protocol, wherein restarting the routing control protocol clears the link state database; transmitting heartbeat messages to one or more neighboring nodes, the heartbeat messages containing information from persistent storage identifying the one ore more neighboring node to indicate that the network node is alive; transmitting a first link state information request message to a first neighboring node, the first link state information request message referencing dummy link state information; transmitting a second link state information request message to a second neighboring node, the second link state information request message referencing dummy link state information.

Another aspect of the invention is a network node connected to one or more neighboring nodes in a network. The network node can be characterized by the following features: memory; one or more processor coupled to memory, the one or more processors configured to transmit a first message from the network node to a first neighboring node, the first message referencing dummy link state information and receive a second message from the first neighboring node, the second message referencing dummy link state information, the second message corresponding to an acknowledgement of receipt of the first message by the neighboring node, the one or more processors further configured to receive one or more link state packets from the neighboring node, the one or more link state packets corresponding to link state information in the network; and an interface coupled with the one or more processors for transmitting and receiving the first and second messages and the link state packets.

Another aspect of the invention is a network node comprising an operating system which is operable to acquire link state information from a neighboring network node. The network node can be characterized by the following features: persistant storage for maintaining information associated with one or more neighboring nodes; memory coupled with persistant storage; one or more processor coupled with memory, the one or more processors configured to transmit heartbeat messages to one or more neighboring nodes, the heartbeat messages containing information from persistent storage identifying the one or more neighboring node to indicate that the network node is alive, a first link state information request message to a first neighboring node, the first link state information request message referencing dummy link state information, and a second link state information request message to a second neighboring node, the second link state information request message referencing dummy link state packet.

Still another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

FIG. 2 depicts one possible representation of a routing table, according to specific embodiments.

FIG. 6 is a diagrammatic representation of data structures at various steps during routing table generation, according to specific embodiments.

FIG. 8 is a block diagram showing the components of a router, according to specific embodiments.

DETAILED DESCRIPTION OF SPECIFIC EMBODIMENTS

Figure 1:
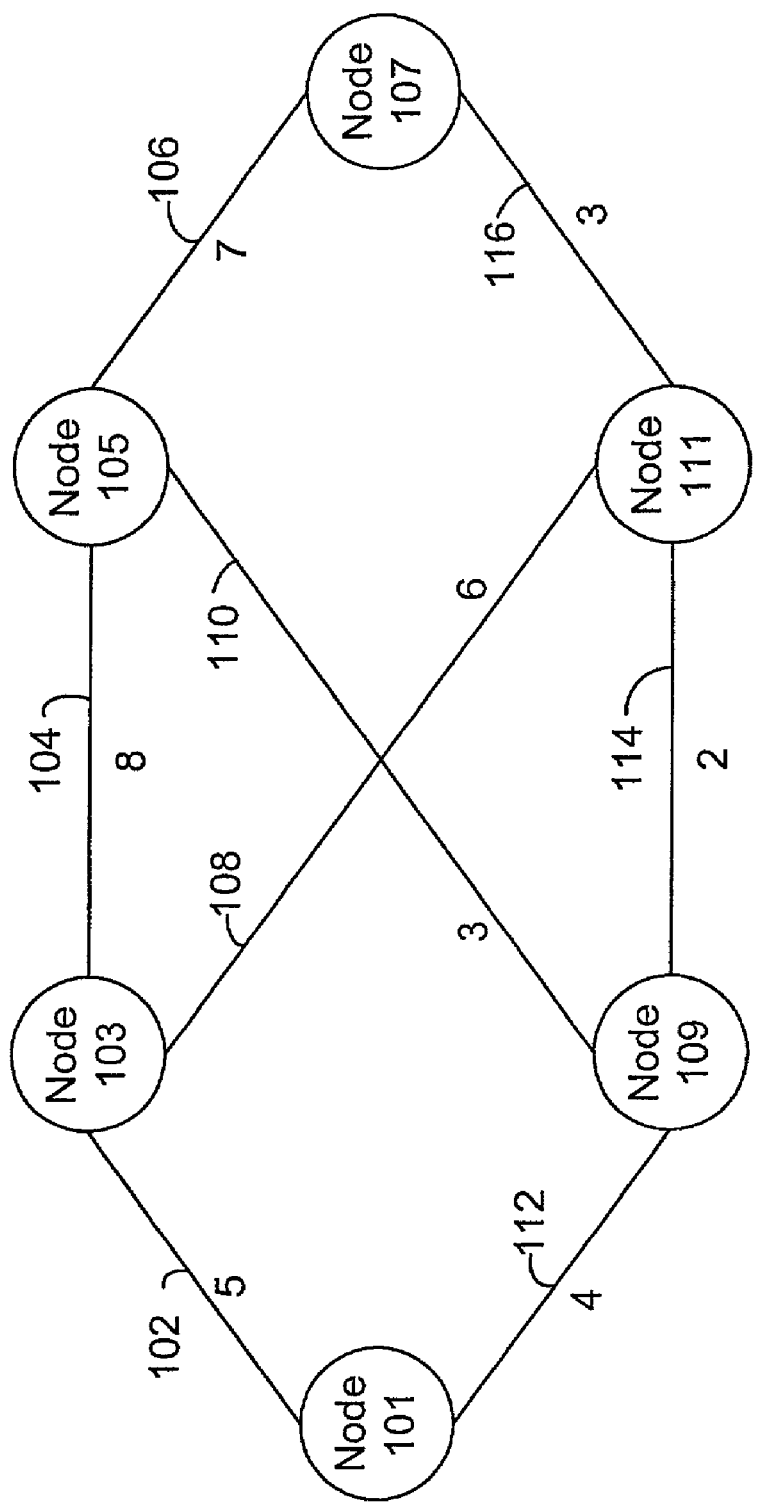
FIG. 1 is a graph of a subnet showing one representation of network nodes connected by links associated with network metrics, according to specific embodiments.

The present invention pertains to methods and systems for resynchronizing a link state database in a network node reintroduced into a network. FIG. 1 is a graph of a subnet showing one representation of network nodes connected by links associated with network metrics, according to specific embodiments. Each network node 101, 103, 105, 107, 109, and 111 can represent a router associated with a router table. Nodes are connected to other nodes through communication lines or links 102, 104, 106, 108, 110, 112, 114, and 116. For example, network node 101 is connected to node 103 through link 102. Each link is assigned a metric value. The metric value can be some function of distance, bandwidth, average traffic, communication cost, delay, or other type of cost. In FIG. 1, link 102 between nodes 101 and 103 is assigned a metric value of 5. Link 112 between nodes 109 and 101 is assigned a metric of 4. Typically, a lower assigned metric value would indicate a preferred link. To access node 105 from node 101, a packet can travel though links 102 and 104 with metric values of 5 and 8 totaling 13 or it can travel through links 112 and 110 with metric values of 4 and 3 totaling 7. The preferred path between node 101 and 105 would consist of links 112 and 110.

Figure 2:
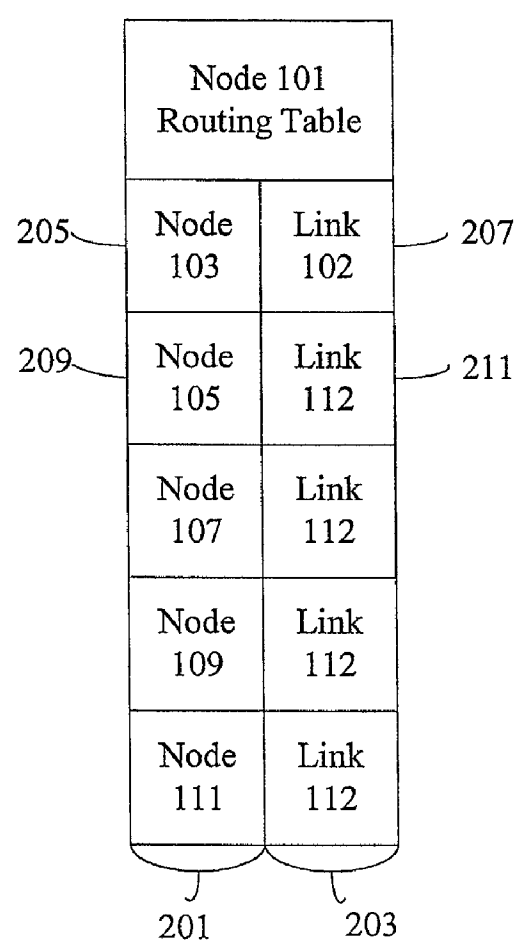

Network node 101 determines whether to transmit a packet through link 102 or through link 112 by using a routing table. FIG. 2 depicts one possible representation of a routing table for node 101, according to specific embodiments. Column 201 shows the destination nodes accessible in the network. Each destination node corresponds with a link in column 203. A packet with a destination node 103 in table entry 205 would be transmitted on link 102 based on table entry 207. A packet with a destination node 209 would be transmitted on link 112 based on table entry 211. The routing table allows node 101 to route the packet along the link included in the preferred path.

Several algorithms are used to find the preferred path between two nodes in a graph. Dijkstra's algorithm (1959) can be run to compute the preferred path to all possible destinations. Dijkstra's algorithm is hereby incorporated by reference for all purposes. Dijkstra's algorithm can be used in conjunction with link state routing protocols to build routing tables for a particular network node. Routing protocols include OSPF (Open Shortest Path First) and IS-IS (Intermediate System-Intermediate System). IS-IS is described in ISO/IEC 10589 and RFC 1195, the entirety of which are hereby incorporated by reference for all purposes. Routing protocols generally are described in *Interconnections, Second Edition: Bridges, Routers, Switches, and Internetworking Protocols* by Radia Perlman (Addison Wesley Professional Computing Series), the entirety of which is hereby incorporated by reference for all purposes. In order to determine network topology to build a routing table, information from each node in the network is required. The link state routing algorithm requires each router to provide a metric associated with each link connecting it to its neighbors. One way of finding a metric is to send an ECHO packet over the link to determine a round-trip time. Metrics can also be assigned based on bandwidth.

Figure 3:
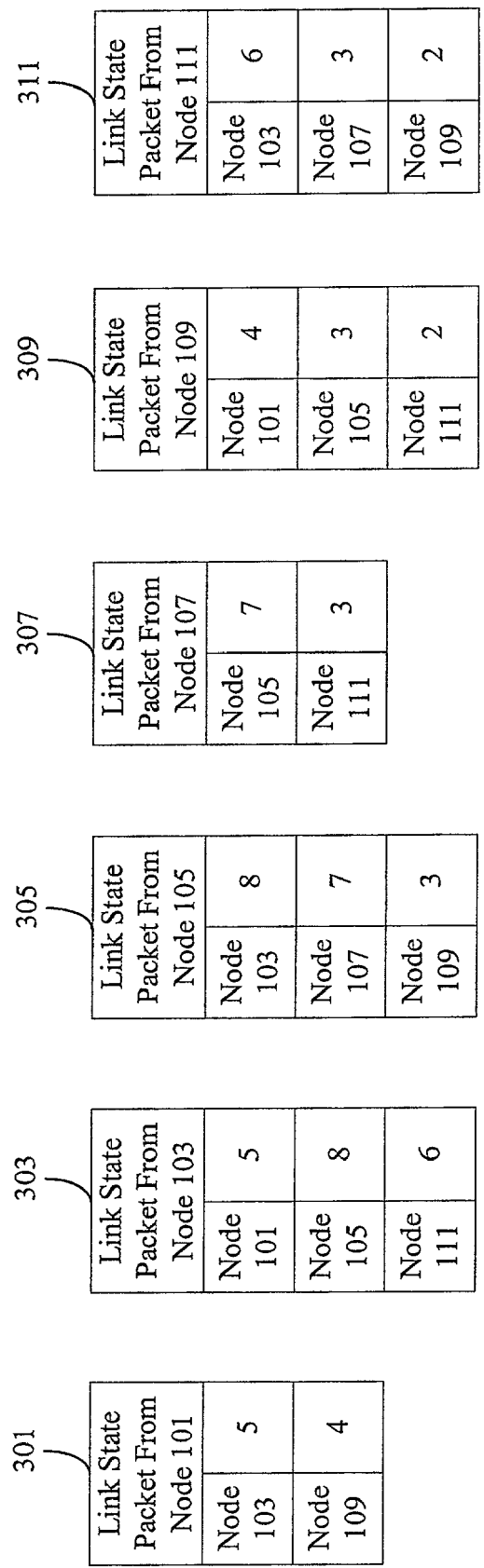
FIG. 3 is a diagrammatic representation of link state packets having metrics associated with links at each interface, according to specific embodiments.

As soon as a router determines a metric value for each of its links, it can build link state packets containing information about metric values associated with its links. FIG. 3 shows typical link state packets that the network nodes in FIG. 1 can provide. A link state packet 301 from node 101 can contain a metric value for the link to node 103 and the metric value for the link to node 109. A link state packet 309 from node 109 can contain the metric value of 4 for the link to node 101, the metric value of 3 for the link to node 105, and a metric value of 2 for the link to node 111. The link state packets are distributed from each router to all of the nodes in the network. A link state packet 311 from node 111 is distributed to nodes 101, 103, 105, 107, and 109.

After a router has accumulated link state packets from all of the network nodes, the router can determine network topology and construct a network topology graph using information about each link in the link state packets.

A network node uses several other mechanisms to distribute link state packets reliably to other nodes in a network. Flooding in its simplest form requires that a network node receive a packet on one interface and transmit the packet on all other interfaces. To keep flooding in check however, various information is used to indicate whether a received link state packet should be retransmitted. Some mechanisms include sequence numbers, age, lifetimes, and time stamps. Sequence numbers can be used to determine which link state packet received from a particular source is newer. Every time a link state packet is transmitted by the originating network node, the sequence number of the link state packet is incremented. Lifetime, age, and time stamp fields can be used to delete link state packets that have been moving around in the network for too long a period of time. Each time a link state packet arrives at a network node, the age is incremented. When a network node receives a link state packet, the network node checks to determine whether the packet is too old. If the packet is too old, it can be discarded. If the packet is not too old, the network node can also checks to determine whether the recently received link state packet is newer than one in memory originating from the same source. If the link state packet is older or a mere duplicate of one already received, the link state packet is discarded. If the link state packet is new, it is forwarded on all interfaces except the one it was received on.

Figure 4:
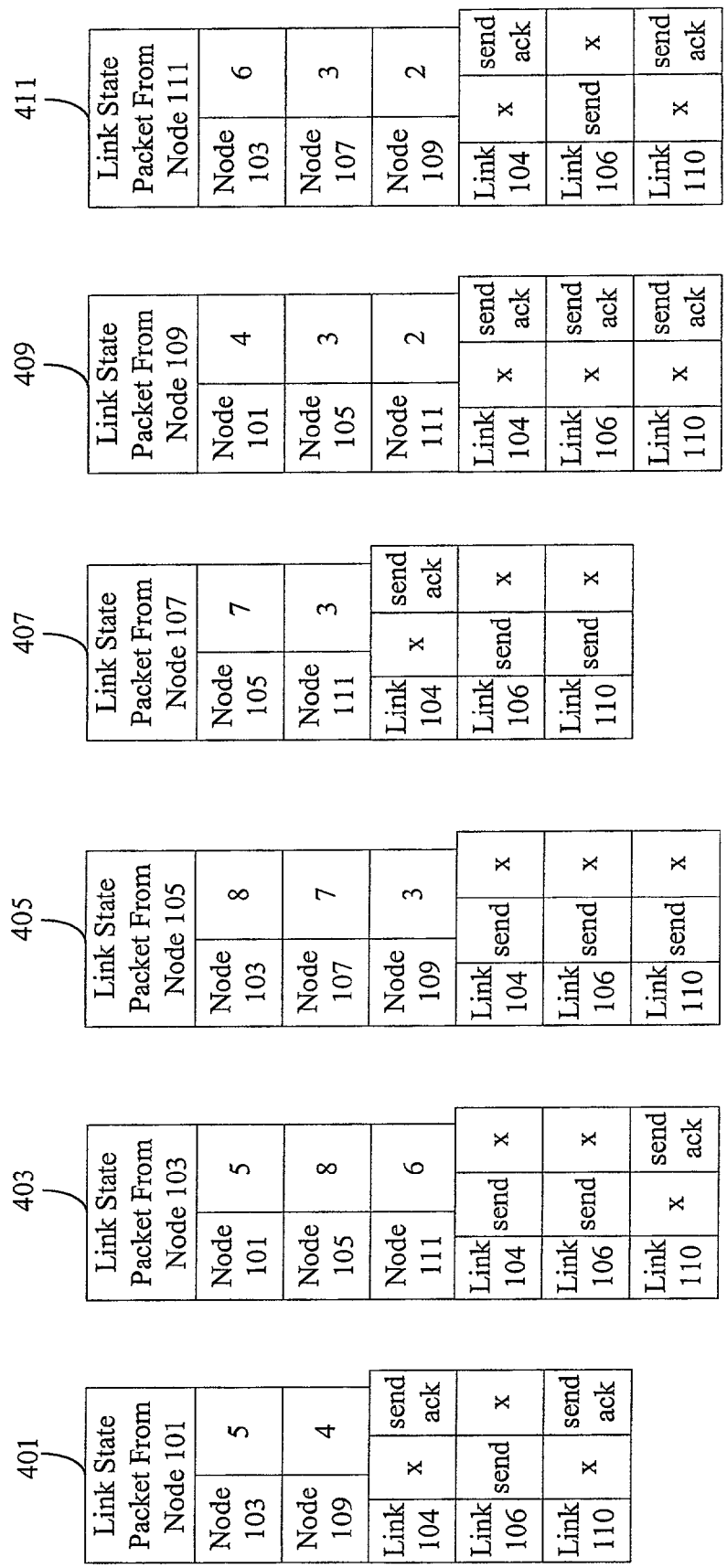
FIG. 4 shows one mechanism used in a network node to determine whether link state packets should be forwarded or acknowledged, according to specific embodiments.

FIG. 4 shows one mechanism used in a network node to determine how the link state packets should be forwarded or acknowledged. A network node receives link state packets 401, 403, 407, 409, and 411 from nodes 101, 103, 107, 109, and 111. The link state packet from each source node contains information about the cost from the source node to the nodes neighboring the source node. When a network node 105 receives a link state packet originating from node 107 newer than any link state packet in memory originating from node 107, flags associated with link state packet 407 are set. The flags toggled can include transmit flags such as Send Routing Message Flags that indicate that the link state packet should be sent out on that interface. Acknowledge flags, such as Send Sequence Numbers Flags can also be toggled on an interface so that an acknowledgment is transmitted on that interface. Node 105 receiving a new link state packet 407 on link 104 can toggle the transmit flags associated with links 106 and 110 and can set an acknowledge flag on link 104. The transmit or send flags indicate that the packet should be sent on the indicated link. The acknowledge flags indicate that an acknowledgement should be sent.

The same link state packets can be received at network node 105 on all interfaces. Link state packet 409 received on all interfaces results in toggling of all acknowledge flags and thus link state packet 409 is not forwarded on any interface but is acknowledged on all interfaces. It should be noted that various data structures can be used to keep track of what link require transmission or acknowledgement. Instead of associating flags with each link state packet, a separate data structure can be used to contain toggle information. In one embodiment, a buffer is used to hold various received link state packets until a separate data structure is updated. The link state packets in memory at a network node can be referred to as a link state database associated with the network node.

A link state packet originating from node 105 may require transmission across all interfaces. A link state packet at a particular node with send flags toggled on all network node interfaces typically indicates that the link state packet is originating from the network node. A link state packet may originate from a network node under several circumstances. A network may be configured to require periodic link state updates. A network node 105 may transmit a link state packet containing information about links to neighboring nodes every 24 hours. Alternatively, transmission of the link state packet may be required when the network node 105 detects a change in link state. For example, node 105 may detect that it no longer can communicate with node 107. Node 105 can be configured to transmit information about the change in link state to the other nodes in the network using link state packet 405, so that the other network nodes can gather updated link state information to build new network graphs.

Network nodes use several mechanisms to determine whether links to neighboring nodes are still available. Heartbeat messages such as Hello messages are sent periodically to neighboring nodes. Hello messages contain information, for example system IDs or MAC addresses, associated with the destination node for the hello message. If a node 105 fails to receive a Hello message from a neighboring node 107, it may determine that the link 106 has failed. Hello multipliers define intervals that allow several attempts to transmit a Hello message. For example, where a Hello multiplier is three, three Hello messages can be lost before the network node determines that the link is offline. Hello multipliers provide that the link is not set to failed until several expected Hello messages are not received. A link can also be set to failed when a received Hello message contains incomplete or incorrect information.

The operation of network node 107 can be disrupted when node 107 is temporarily taken offline and subsequently reintroduced into the network. Network node disruption occurs, for example, during a crash and restart of the routing control protocol running on node 107. After a routing control protocol crash and restart, node 107 typically transmits a Hello message to a neighboring node 105 that indicates to the neighboring node 105 that node 107 is a newly introduced node. The Hello message typically has incomplete information. The incorrect Hello message directs node 105 to transmit all of its link state packets to node 107. In other words, the transmit flags for link state packets 401, 403, 405, 407, 409, and 411 for link 106 between node 105 and 107 are set to transmit. The transmission of all node 105 link state packets effectively allows node 107 to acquire a copy of the link state database of node 105. The failure to transmit a Hello message with the correct information also causes node 105 to generate a new link state packet 405 and set the transmit flags for the packet for all links. Node 105 can then transmit the new link state packet 405 through all interfaces. The new link state packet 405 is propagated throughout the network, resulting in the generation of new network graphs at every network node. Network nodes receiving the new link state packet 405 use the information to generate new routing tables.

As describe above, current mechanisms do not allow a reintroduced node to acquire link state information from a neighboring node without triggering the generation of new link state packets at the neighboring node. Failure to prevent the generation of new link state packet at the neighboring nodes results in flooding of the new link state packet throughout the network and the processing of the new link state packet in the generation of new routing tables at nodes throughout the network.

Figure 5:
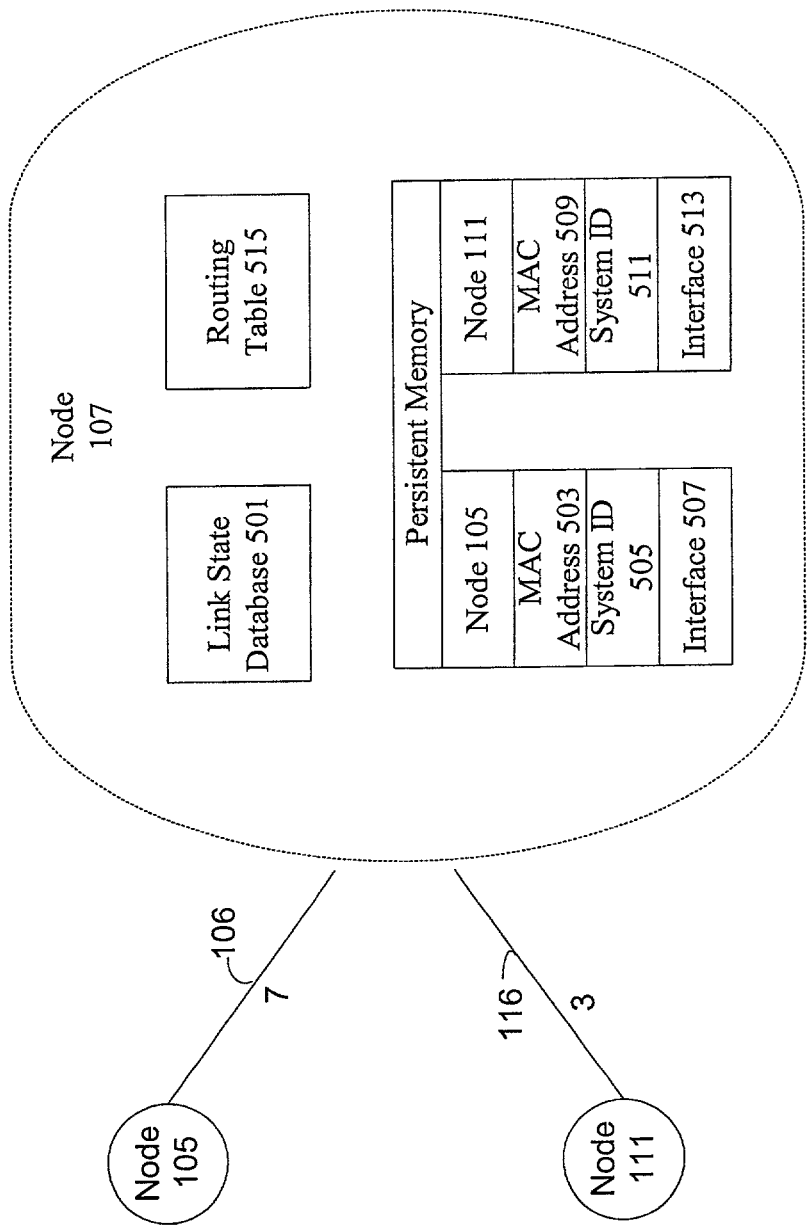
FIG. 5 is a diagrammatic representation showing a node having a database being reintroduced into a network, according to specific embodiments.

FIG. 5 is a diagrammatic representation showing a node having a database being resynchronized in a network, according to specific embodiments. Node 107 is connected to connected to node 105 through link 106. Node 107 is connected to node 111 through link 116. Node 107 has link state database 501 containing link state packets from nodes 101, 103, 105, 109, and 111. Using the link state database 501, node 107 builds routing table 515 containing instructions on what link a particular packet should be transmitted. Node 107 periodically transmits heartbeat messages such as Hello messages to nodes 105 and 107. The Hello messages sent to node 105 may contain the MAC address 503 of node 105, system ID 505 of node 105, or other information. The Hello message sent to node 111 similarly may contain MAC address 509 of node 111, system ID 511 of node 111, or other information. Nodes 105 and 111 also can periodically transmit Hello messages containing node 107 identifier information to node 107.

According to specific embodiments, node 107 stores information associated with neighboring nodes 105 and 107 into persistent memory. MAC addresses 503 and 509, system IDs 505 and 511, and their associated interfaces 507 and 513 are stored in some form of memory that allows network node 107 to retrieve the data after restart or reinitialization. The persistent memory may be a magnetic disk. The information stored allows node 107 to continue to send Hello messages to neighboring nodes 105 and 111 even after temporarily being taken off the network for reinitialization or restart. According to various embodiments, information such as MAC addresses 503 and 509 and system ID 505 and 511 required to transmit Hello messages to node 105 and 111 are committed to persistent storage immediately prior to taking node 107 offline.

When node 107 is reintroduced into the network through links 106 and 116 to nodes 105 and 111, Hello messages are transmitted to nodes 105 using information 503, 505, and 507 and to node 111 using information 509, 511, and 513. The Hello messages transmitted to nodes 105 and 111 within the Hello multiplier allow node 107 to be reintroduced without triggering generation of new link state packets at node 105 and node 111.

According to various embodiments, node 107 does not have a populated link state database 501 and it does not have a routing table 515 stored in persistent memory, following a temporary offline period. Node 107 can acquire the link state packets to populate the link state database 501 from neighboring node 105 or neighboring node 107. The acquired link state packets can be used to create a routing table 515.

Node 107 transmits a link state packet request to one of its neighboring nodes 105 and 111. Node 107 may select the neighboring node randomly, or it can use metric information stored in persistent memory to select the neighboring node 111 with the lowest metric. By selecting the neighboring node with the lowest metric, node 107 can acquire link state packets from node 111 efficiently. Node 107 transmits the link state packet request message, such as a Complete Sequence Numbers Packet to node 111. The CSNP allows node 107 to indicate what packets node 107 has in its link state database 501. An empty packet from node 107 to node 111 indicates that node 107 has no link state packets in its link state database 501. Upon receiving the CSNP indicating that node 107 has no link state packets, node 111 toggles the send flags associated with the link 116 between nodes 111 and 107 on all of its link state packets. All of the packets in the link state database associated with node 111 are now flagged to be transmitted across link 116 to node 107.

The CSNP, however, is configured as an unacknowledged message. Node 107 does not receive any indication from node 111 that the CSNP has been processed. Node 107 may receive link state packets from node 111, but the link state packets from node 111 may be packets forwarded during network operation and not as a result of the CSNP from node 107.

Therefore, according to specific embodiments, node 107 transmits a CSNP indicating that node 107 has a dummy link state packet in link state database 501. Generally, any link state packet that receiving node 111 will not have referenced in the link state database associated with receiving node 111 is referred to herein as dummy link state information or a dummy link state packet. The dummy link state packet references a dummy node that the current node knows is not referenced in the link state database of the neighboring node. The dummy link state packet may reference an unused network node identifier. Alternatively, the dummy link state packet transmitted in a CSNP from node 107 may reference an unused identifier associated with node 107. Node 111 receiving the CSNP with a dummy link state packet references its own link state database and determines that it does not have the dummy link state packet. Node 111 then transmits a partial link state packet request such as a Partial Sequence Number Request to node 107. The PSNP from node 111 contains a request to node 107 to transmit the dummy link state packet.

Node 107 receives the PSNP from node 111, allowing node 107 to confirm that the CSNP containing the dummy link state packet from node 107 was received and processed by node 111. The PSNP from node 111 referencing the dummy link state packet from node 107 can be used as an acknowledgement from node 111 that node 111 has received the CSNP referencing the dummy link state packet. Node 107 can leave the PSNP from node 111 unacknowledged.

According to various embodiments, node 107 receives a PSNP from node 111 referencing the dummy link state packet and node 107 receives link state packets from the link state database associated with node 111 through link 116. Node 107 can now populate link state database 501 with link state packets. Node 107 uses age, sequence number, and time stamp checking mechanisms as noted above to insure that the newest link state packet is placed in link state database 501. Node 107 can transmit a CSNP containing link state packets in link state database 501 to node 111 without referencing the dummy link state packet to prevent the neighboring node from sending link state packets from sending link state packets already in link state database 501. Using the CSNP without referencing the dummy link state packet in the manner described above saves network bandwidth.

According to various embodiments, Node 107 may not have received all the link state packets from the link state database of node 111. Node 107 can use a CSNP without referencing the dummy link state packet to acquire the remaining nodes from neighboring node 111. Node 107 can transmit a CSNP containing link state packets in link state database 501 to node 111 without referencing the dummy link state packet five seconds after the receipt of the PSNP referencing the dummy link state packet. Node 111 processes the CSNP without reference to the dummy link state packet and toggles the transmit flags, such as the SRM flags, of all link state packets not referenced in the CSNP. The link state packets not referenced in the CSNP are flagged for transmission to node 107.

Node 107, however, may not receive a PSNP referencing the dummy link state packet after transmitting the CSNP referencing the dummy link state packet to node 111. Node 107 can then transmit a CSNP referencing the dummy link state packet to node 105 across link 106. Node 105 receiving the CSNP references its link state database to determine whether the dummy link state packet is in its database. Node 105 also toggles the transmit flags for all link state packets in its link state database for link 106 to node 107. As described above, node 105 references the dummy link state packet in a PSNP to node 107. Upon receipt of the PSNP referencing the dummy link state packet at node 107, node 107 has an acknowledgement from node 105 that the CSNP has been received. Node 107 receives the link state packets from node 105 and places the newest link state packets into link state database 501.

Although the invention is described with reference to a node 107 connected to two neighboring nodes 105 and 111, it should be appreciated that the invention can be applied in various ways to numerous network arrangements. Node 107 may transmit a CSNP referencing a dummy link state packet to all of its neighboring nodes simultaneously. Node 107 can elect to transmit a CSNP referencing a dummy link state packet to neighboring nodes sequentially every two seconds. The CSNP messages transmitted by node 107 may always contain a reference to a dummy link state packet, so that node 107 has an acknowledgement that the CSNP was received. Alternatively, node 107 can send CSNP messages without reference to a dummy link state packet to any neighboring node that has sent a PSNP referencing the dummy link state packet. Time intervals between transmission of various CSNP messages with or without referencing a dummy link state packet can also vary. According to various embodiments, a CSNP referencing a dummy link state packet is sent to a different neighboring node every five seconds. A CSNP without reference to a dummy link state packet can then be transmitted to any neighboring node that has responded with a PSNP referencing the dummy link state packet.

Node 107 receives link state packets from neighboring nodes as a result of the transmission of CSNP messages referencing a dummy link state packet. According to various embodiments, if no new link state packet has arrived at any interface of node 107, node 107 uses the link state packets in link state database 501 to generate a network graph and a routing table 515.

FIG. 6 is a diagrammatic representation of data structures at various steps during routing table generation for node 101 referenced in FIG. 1. Each PATH (permanent) and TENT (tentative) data structure contains a parent field, a node field, and a distance field indicating the value of the metric associated with the link between the parent and the node. A node 101 constructing a network graph will initially contain an empty PATH data structure. The neighbors of node 101 are placed in the TENT data structure at 601. The node connected to node 101 with the shortest link length is moved into the PATH data structure. Node 109 is moved into the PATH data structure because its link metric of 4 is less than the link metric of 5 associated with the link between node 103 and 101.

Before node 109 is moved into the PATH data structure, however, link state routing algorithms require application of two-way connectivity checking. The two-way connectivity check ensures that the link state packets from node 101 and node 109 both indicate that the two nodes are directly connected. The two-way connectivity checking provides a mechanism to avoid errors in link failure situations and makes it more likely that different network nodes will construct the same network graphs.

The two-way connectivity checking, however, requires that the link state packet of node 109 be traversed. The traversal requires valuable processor resources and time, particularly since link state packets may contain information about many nodes and two-way connectivity checking is performed on every link in the network.

After two-way connectivity checking is performed for the link between node 101 and node 109, node 109 is placed into the PATH data structure with a metric value of 4 and a parent node 101. The link state packet of node 109 is then examined to find neighbors of node 109. Node 105 with a distance of 7 through node 109 is not in PATH or TENT data structures and is added to the TENT data structure. Node 11 with a distance of 6 from node 101 is also added to the TENT data structure at 603. Node 101 is already in the PATH table and is therefore ignored.

The link state packet of node 103 is checked for two-way connectivity to ensure that node 101 is a neighbor at 605. Node 103 is determined to have the shortest distance to node 101 and is placed in the PATH data structure at 605. The neighbors of node 103 are examined. Nodes 105 and 111 each have distances from 101 through node 103 that are greater than the distances through node 109 already placed in the TENT data structure. Nothing is added to the TENT data structure at 605.

Node 111 with a length of 6 is added to the PATH data structure after two-way connectivity checking at 607. The link state packet of node 111 is examined to find neighbors of 111 that may be added to the TENT data structure. Node 107 has a distance from node 101 through parent node 111 of 9 and is added to the TENT data structure. Node 103 and node 109 are already in the PATH data structure and are not added to the TENT data structure.

Node 105 is added to the PATH data structure at 609 after two-way connectivity checking. The neighbors of node 105 are examined in the link state packet from 105 to determine whether node 105 has a better path to one of its neighboring nodes 107, 103, or 109 than one already found. Nodes 103 and 109 are already in the PATH data structure and are not added to the TENT data structure. Node 107 has a distance of 14 through node 105 from node 101. The distance of 14 is greater than the distance already contained in the TENT data structure for node 107, so the TENT data structure is not modified. Node 107 is then added to the PATH data structure after two-way connectivity checking.

Router 101 has a complete PATH data structure at 411 and can now construct a router table. A packet destined for node 109 is sent along the link connecting 101 and 109. A packet destined for node 103 is sent along the link connecting 101 and 103. A packet destined for node 111 has an optimal path through parent node 109, so the packet is sent along the link connecting 101 and 109. The same holds true for node 105. Node 107 has a preferred path through node 111 that has a preferred path through 109, so the packet is sent along the link connecting 101 and 109. A routing table is constructed with the derived link data so that a router can determine on what link a packet should be sent.

Figure 7:
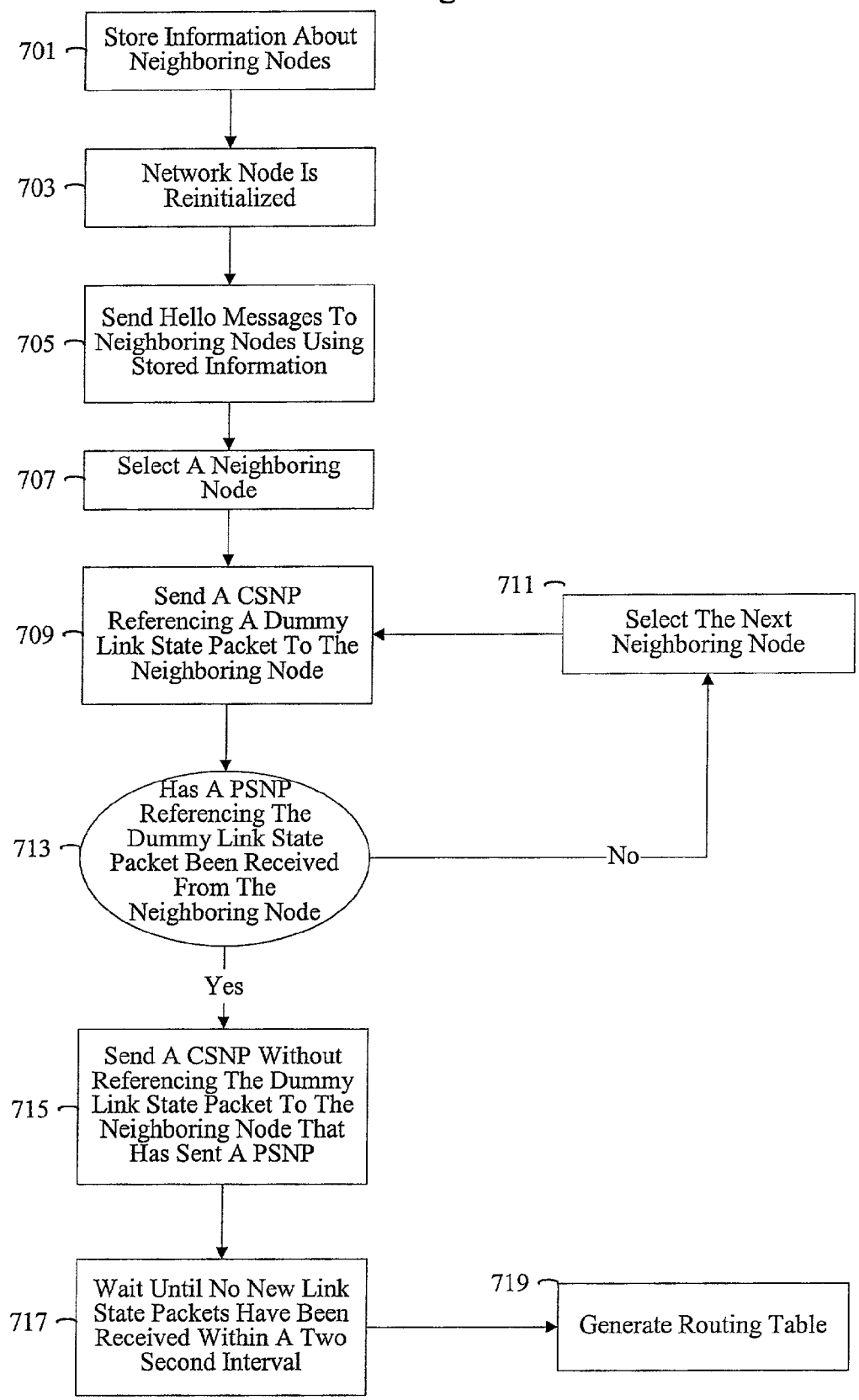
FIG. 7 is a process flow diagram describing the steps for optimizing the reintroduction of a network node into a network, according to specific embodiments.

FIG. 7 is a process flow diagram describing the steps for optimizing the reintroduction of a network node into a network. At 701, information about neighboring nodes is stored. Information can include MAC addresses, system IDs, link metrics, and other information that is used to transmit heartbeat or Hello messages to neighboring nodes. The information can be committed to persistent memory periodically or prior to reinitialization. At 703, the network node is reinitialized. An example of reinitialization is the restart of the routing control protocol running on the network node. Upon reintroduction into the network, the network node transmits Hello messages to its neighbors using information stored in persistent memory. The network node can then select a neighboring node, or place neighbors in a particular order based on link metrics.

A CSNP referencing a dummy link state packet is transmitted to the neighboring node at 709. If the network node does not receive a PSNP referencing the dummy link state packet from the neighboring node at 713 within a period of time, the next neighboring node is selected at 711 and a CSNP message referencing a dummy link state packet is transmitted to the next neighbor at 709. If a PSNP referencing the dummy link state packet is received from the neighboring node at 715, a CSNP without reference to a dummy link state packet is transmitted to each neighboring node that has sent a PSNP. The network node then waits for link state packets until none have arrived within the last two seconds 717. The link state packets received are then used to generate a routing table at 719.

It should be noted that the present invention does not require that the steps of this process be performed in any specified sequence. For example, in one embodiment of the invention, the CSNP messages referencing a dummy link state packet can be sent simultaneously to all neighboring nodes. In addition, CSNP messages can always be sent with reference to a dummy link state packet.

FIG. 8 is a block diagram showing the components of a router, according to specific embodiments. A router 810 suitable for implementing the present invention includes a master central processing unit (CPU) 862, interfaces 868, and a bus 815 (e.g., a PCI bus). When acting under the control of appropriate software or firmware, the CPU 862 is responsible for such router tasks as routing table computations and network management. It preferably accomplishes all these functions under the control of software including an operating system (e.g., the Internetwork Operating System (IOS®) of Cisco Systems, Inc.) and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific network node of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 865) configured to store data, program instructions for the general-purpose network operations and/or the packet redirection and replication functions described herein. The program instructions may control the operation of an operating system and/or one or more applications, for example. The memory or memories may also be configured to store packets for replication, replicated packets, packet identification criteria, etc.

Information and program instructions may be employed to implement the systems/methods described herein. The present invention can relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as that produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. Therefore, the scope of the invention should be determined with reference to the appended claims.

What is claimed is:

1. A method for a network node connected to one or more neighboring nodes in a network to acquire link state information from one or more neighboring nodes, the method comprising:

transmitting a first message from the network node to a first neighboring node, the first message referencing dummy link state information that includes link state information not referenced in a link state database included in the first neighboring node;

receiving a second message from the first neighboring node, the second message referencing dummy link state information, the second message corresponding to an acknowledgement of receipt of the first message by the first neighboring node;

receiving one or more link state packets from the first neighboring node, the one or more link state packets corresponding to network link state information.

2. The method of claim 1, wherein the network node ignores the second message.

3. The method of claim 1, wherein the first and second messages are IS-IS messages.

4. The method of claim 1, wherein the first message is a Complete Sequence Numbers Packet.

5. The method of claim 1, wherein the second message is a Partial Sequence Numbers Packet.

6. The method of claim 1, further comprising transmitting a third message from the network node to a second neighboring node, the third message referencing dummy link state information.

7. The method of claim 6, further comprising transmitting a fourth message from the network node to the first neighboring node, the fourth message containing no reference to dummy link state information and directing the first neighboring node to transmit link state information not referenced in the fourth message to the network node.

8. The method of claim 1, further comprising receiving link state information and populating a link state database with the link state information.

9. The method of claim 1, further comprising using the link state information to generate a routing table.

10. The method of claim 1, wherein the dummy link state information references a dummy link state packet that references a non-existent network node.

11. The method of claim 1, wherein the dummy link state information references a dummy link state packet that references an unused identifier of the network node.

12. A method for a network node in a network to request link state information from one or more neighboring nodes, the neighboring nodes coupled with the network node, the method comprising:

maintaining information identifying one or more neighboring nodes in persist storage of the network node;

restarting the routing control protocol of the network node, wherein restarting the routing control protocol clears a link state database;

transmitting heartbeat messages from the network node to one or more neighboring nodes, the heartbeat messages containing information from persistent storage identifying the one or more neighboring node to indicate that the network node is alive;

transmitting a first link state information request message from the network node to a first neighboring node, the first link state information request message referencing dummy link state information that includes link state information not referenced in a link state database included in the first neighboring node; and transmitting a second link state information request message from the network node to a second neighboring node, the second link state information request message referencing dummy link state information.

13. The method of claim 12, further comprising receiving a partial link state information request message from the second neighboring node, the partial link state information request message referencing dummy link state information, wherein receipt of the partial link state information request message acknowledges that the second neighboring node received the second link state information request message.

14. The method of claim 12, wherein transmitting the second link state information request message occurs after transmitting the first link state information request message.

15. The method of claim 12, wherein the first message is a Hello message.

16. The method of claim 12, wherein the second message is a Complete Sequence Numbers Packet.

17. The method of claim 12, further comprising transmitting a third message from the network node to a second neighboring node, wherein the third message is a Partial Sequence Numbers Packet.

18. The method of claim 12, further comprising generating a routing table with the link state packets from one or more neighboring nodes, wherein the routing table is generated when no link state packets have been received for a predetermined period of time.

19. A computer program product comprising a machine readable storage medium on which is provided program instructions for a network node connected to one or more neighboring nodes in a network to acquire link state information from one or more neighboring nodes, the computer program product comprising:

computer code for transmitting a first message from the network node to a first neighboring node, the first message referencing dummy link state information that includes link state information not referenced in a link state database included in the fit neighboring node;

computer code for receiving a second message from the first neighboring node, the second message referencing dummy link state information, the second message corresponding to an acknowledgement of receipt of the first message by first the neighboring node;

computer code for receiving one or more link state packets from the first neighboring node, the one or more link state packets corresponding to link state information in the network.

20. The computer program product of claim 19, wherein the network node ignores the second packet.

21. The computer program product of claim 19, wherein the at and second messages are IS-IS messages.

22. The computer program product of claim 19, wherein the first message is a Complete Sequence Numbers Packet.

23. The computer program product of claim 19, wherein the second message is a Partial Sequence Numbers Packet.

24. The computer program product of claim 19, further comprising transmitting a third message from the network node to a second neighboring node, the third message referencing dummy link state information.

25. The computer program product of claim 24, further comprising transmitting a fourth message from the network node to the first neighboring node the fourth message containing no reference to dummy link state information and instructing the first neighboring node to transmit link state information not referenced in the fourth message to the network node.

26. A network node connected to one or more neighboring nodes in a network, the network node comprising:

memory;

one or more processors coupled to memory, the one or more processors configured to transmit a first message from the network node to a first neighboring node, the first message referencing dummy link state information that includes link state information not referenced in a link state database included in the first neighboring node, and receive a second message from the first neighboring node, the second message referencing dummy link state information, the second message corresponding to an acknowledgement of receipt of the first message by the first neighboring node, the one or more processors further configured to receive one or more link state packets from the first neighboring node, the one or more link state packets corresponding to link state information in the network; and an interface coupled with the one or more processors for transmitting and receiving the first and second messages and the link state packets.

27. The network node of claim 26, the one or more processors further configured to ignore the second message.

28. The network node of claim 26, wherein the first and second messages are IS-IS messages.

29. The network node of claim 26, wherein the first message is a Complete Sequence Numbers Packet.

30. The network node of claim 26, wherein the second message is a Partial Sequence Numbers Packet.

31. The network node of claim 26, the one or more processors further configured to transit a third message from the network node to a second neighboring node, the third message referring to dummy link state information.

32. The network node of claim 31, the one or more processors further configured to transmit a fourth message from the network node to the first neighboring node, the fourth message containing no reference to dummy link state information and instructing the first neighboring node to transmit link state information not referenced in the fourth message to the network node.

33. The network node of claim 26, further comprising a link state database, wherein the received link state packets are used to populate a link state database.

34. The network node of claim 33, wherein the link state database is used to generate a routing table.

35. The network node of claim 26, wherein the dummy link state information references a dummy link state packet that references a non-existent network node.

36. The network node of claim 26, wherein the dummy link state information references a dummy link state packet that references an unused identifier of the network node.

37. A network node comprising an operating system which is operable to acquire link state information from a neighboring network node, the network node comprising:

persistant storage for maintaining information associated with one or more neighboring nodes;

memory coupled with persistant storage; and one or more processors coupled with memory, the one or more processors configured to transmit heartbeat messages from the network node to one or more neighboring nodes, the heartbeat messages containing information from persistent storage identifying the one ore more neighboring node to indicate that the network node is alive, a first link state information request message from the network node to a fit neighboring node, the first link state information request message referencing dummy link state information that includes link state information not referenced in a link state database included in the first neighboring node, and a second link state information request message from the network node to a second neighboring node, the second link state information request message referencing dummy link state packet.

38. The network node of claim 37, wherein the one or more processors are further configured to receiving a partial link state information request message from the second neighboring node, the partial link state information request message referencing dummy link state information, wherein receipt of the partial link state information request message acknowledges that the second neighboring node received the second link state information request message.

39. The network node of claim 37, wherein transmitting the second link state information request message occurs after transmitting the first link state information request message.

40. The network node of claim 37, where the first message is a Hello message.

41. The network node of claim 37, wherein the second message is a Complete Sequence Numbers Packet.

42. The network node of claim 37, wherein the third message is a Partial Sequence Numbers Packet.

43. The network node of claim 37, wherein the one or more processors are further configured to generating a routing table with the link state packets from one or more neighboring nodes, wherein the routing table is generated when no link state packets have been received for a predetermined period of time.

44. An apparatus operable to acquire link state information from one or more neighboring nodes, the apparatus comprising:

means for transmitting a first message from the network node to a first neighboring node, the first message referencing dummy link state information that includes link state information not referenced in a link state database included in the first neighboring node;

means for receiving a second message from the first neighboring node, the second message referencing dummy link state information, the second message corresponding to an acknowledgement of receipt of the first message by the first neighboring node; and means for receiving one or more link state packets from the first neighboring node, the one or more link state packets corresponding to link state information in the network.

45. The apparatus of claim 44, wherein the network node ignores the second message.

46. The apparatus of claim 44, wherein the first and second messages are IS-IS messages.

47. The apparatus of claim 44, wherein the first message is a Complete Sequence Numbers Packet.

48. The apparatus of claim 44, wherein the second message is a Partial Sequence Numbers Packet.

49. The apparatus of claim 44, further comprising means for transmitting a third message from the network node to a second neighboring node, the third message referencing dummy link state information.

50. The apparatus of claim 49, further comprising means for transmitting a fourth message from the network node to the first neighboring node, the fourth message containing no reference to dummy link state information and instructing the first neighboring node to transmit link state information not referenced in the fourth message to the network node.

* * * * *